(No Model.) 2 Sheets—Sheet 1.
J. H. DUNCAN.
MANUFACTURE OF SALT.
No. 368,881. Patented Aug. 23, 1887.
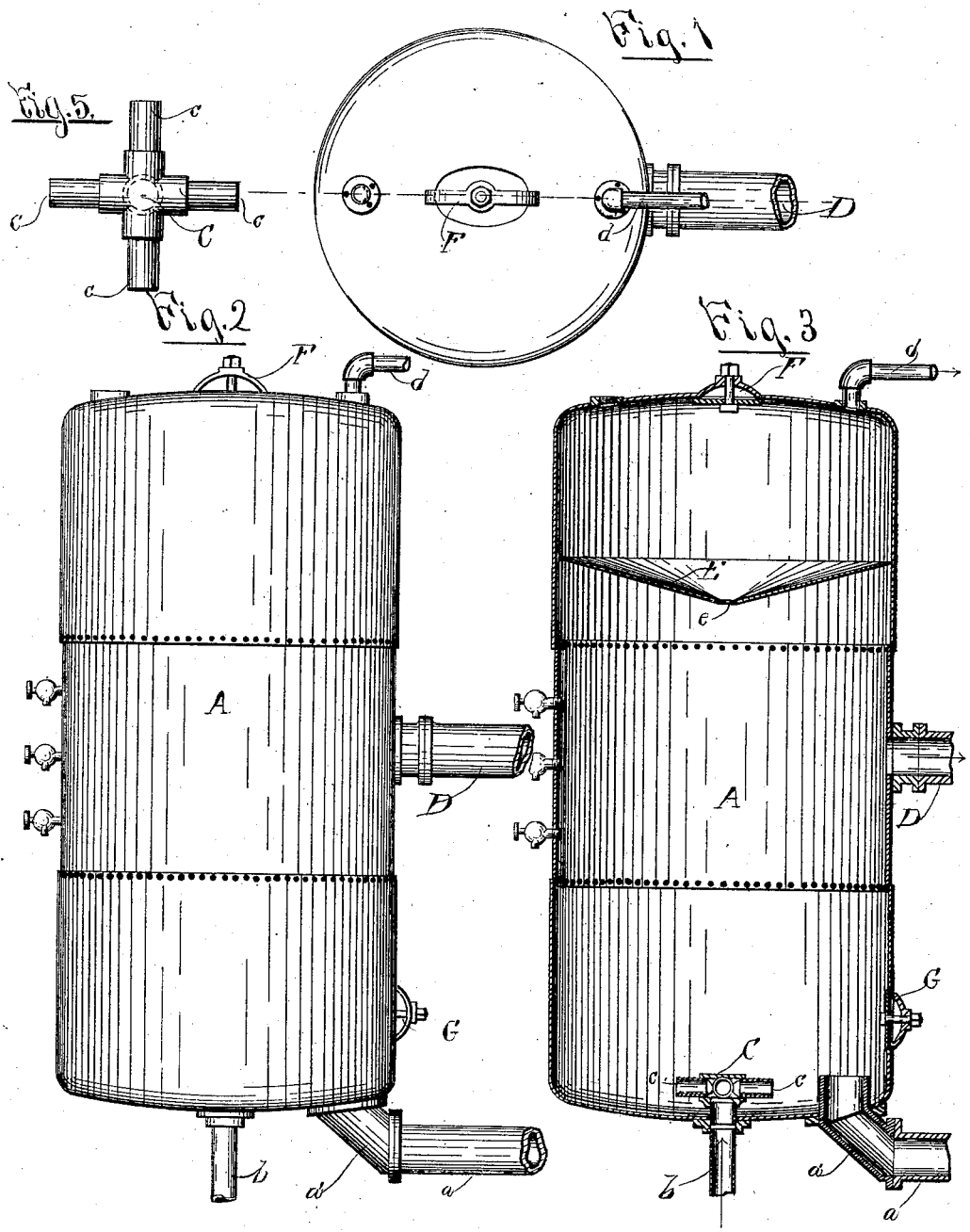
WITNESSES:
Arthur S. Parsons.
E. R. Cannon
INVENTOR
John H. Duncan
BY
Hey & Gibb
ATTORNEYS (No Model.) 2 Sheets—Sheet 2.
J. H. DUNCAN.
MANUFACTURE OF SALT.
No. 368,881. Patented Aug. 23, 1887.
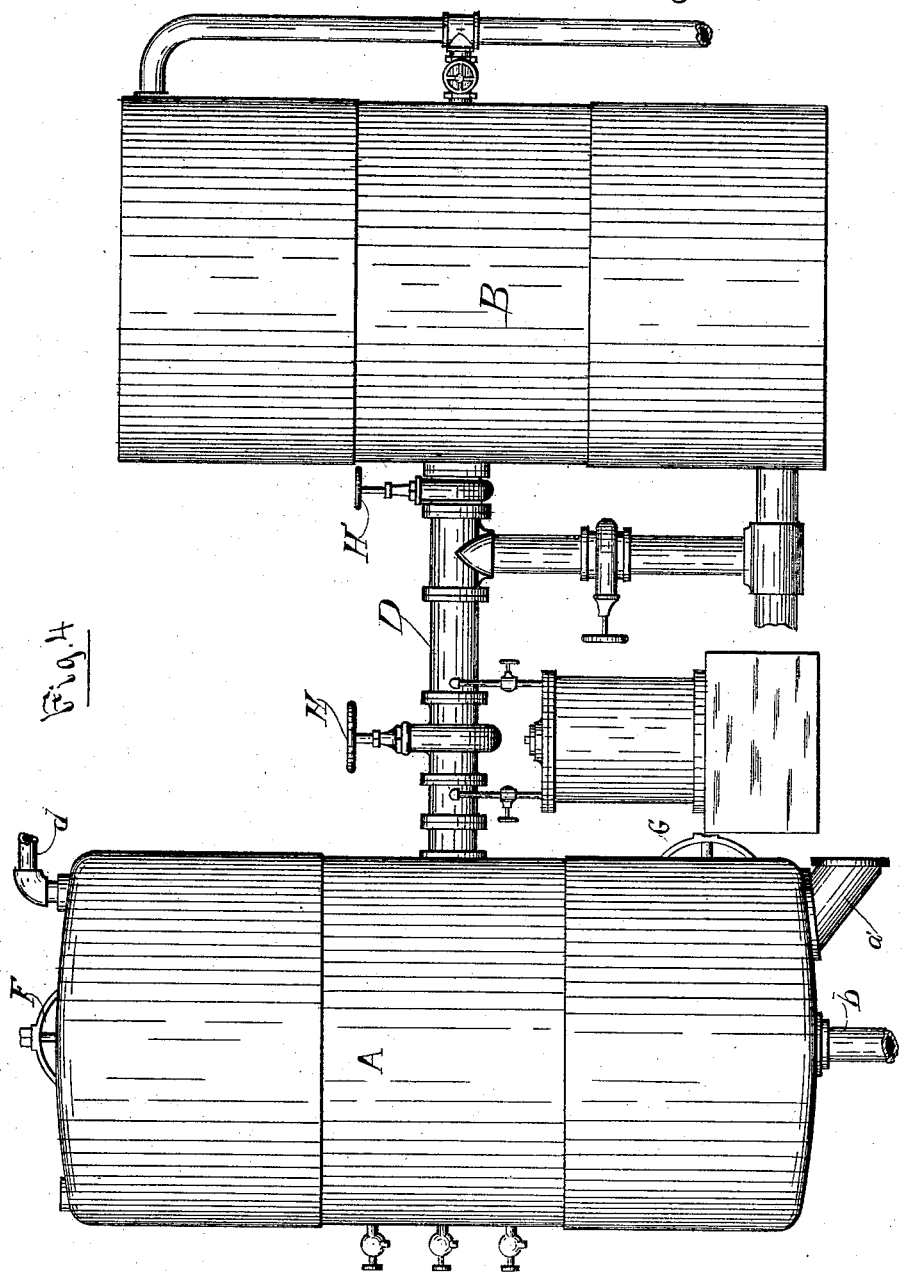
WITNESSES:
Arthur O. Parsons
E. C. Cannon
INVENTOR
John H. Duncan
BY
Hey and Gibbs
ATTORNEYS

UNITED STATES PATENT OFFICE.

JOHN H. DUNCAN, OF SYRACUSE, NEW YORK.

MANUFACTURE OF SALT.

SPECIFICATION forming part of Letters Patent No. 368,881, dated August 23, 1887.

Application filed January 29, 1887. Serial No. 225,860. (No model.)

*To all whom it may concern:*

Be it known that I, JOHN H. DUNCAN, of Syracuse, in the county of Onondaga, in the State of New York, have invented new and useful Improvements in the Manufacture of Salt, of which the following, taken in connection with the accompanying drawings, is a full, clear, and exact description.

My invention relates to improvements in the manufacture of salt, and the object is to treat natural saline brines preliminary to the introduction of the same into a purifier, to prepare the brine for the filtering process, to free the brine of the chlorides and other impurities, and thus secure a comparatively pure article of salt, and to greatly expedite the production of salt by shortening the time required in the various steps of the process of manufacture, and at the same time to prevent the corrosion of the pipes of the apparatus used in the process which occurs through the deposit of the impurities on the pipes where the brine is not thoroughly purified before being introduced into the grainer; and to this end my invention consists, in the first place, of providing a steam-tight vessel having a pipe or inlet in the bottom thereof for the introduction of the brine into the said vessel and a pipe in the bottom of the vessel for the introduction of a column of steam which is introduced simultaneously with the brine, and then drawing off the brine, when ebullition takes place, into a filter for purifying the brine.

It consists, furthermore, in the construction and detail arrangement of the said steam-tight vessel and the brine and steam pipes and their connections, all as hereinafter more particularly described, and pointed out in the claims.

In specifying my invention reference is had to the accompanying drawings, forming a part hereof, like letters indicating corresponding parts in all the views, in which—

Figure 1 is a top plan of the boiling-vessel. Fig. 2 is a side elevation of the same, illustrating the connection of the various parts with the boiling-vessel. Fig. 3 is a transverse vertical section of the boiling-vessel, taken on line *x x*, Fig. 1, showing the interior construction and arrangement of the said vessel and the pipes. Fig. 4 shows the boiling-vessel connected to the filter, and Fig. 5 is a detached detail view of the steam-column discharge in the boiling-vessel.

My invention relates particularly to the manufacture of salt, wherein the natural saline brines are first heated by raising the temperature thereof in a steam-tight vessel to 212° Fahrenheit. Then, when ebullition takes place, the brine is drawn off with the chlorides in solution into a filter of the kind termed "Hyatt filter," or any other suitable filter, and purified in the filter under steam-pressure, after which the brine is forced into a saturating-vessel, and saturated to 100° salinometer, and then introducing the saturated brine into a grainer, in which the salt is formed and precipitated to the bottom thereof.

In carrying out this process heretofore, much difficulty has been experienced in the first step of the process—*i. e.*, properly and thoroughly bringing to a state of suspension in solution the particles of foreign matter or impurities contained in the brine, and the success of the process (so far as economy of manufacture and quality of product is concerned) depends chiefly upon thus bringing to a state of suspension the impurities and foreign matter contained in the brine, whereby the separation of said impurities from the brine is more readily effected during filtration; and my present invention is designed more particularly to treat the brine in the boiling-vessel to secure the desired condition of the brine for introduction to the filter, so as to accomplish the desired result, and also to provide a steam-tight boiling-vessel with peculiar connections and fittings for carrying out the aforesaid process.

A represents the said vessel, constructed of cylindrical form, as shown in Figs. 1 and 2, of boiler-iron in the usual manner, with steam-tight joints, and in the bottom thereof I connect the brine-inlet pipe *a* and the steam-pipe *b*, as best shown in the sectional view, Fig. 3. About midway the height of the vessel A, I connect the brine-exit pipe D, leading into the filter B, as illustrated in Fig. 4, providing the said pipe D with valves or gates H H', to regulate and control the flow of brine to the filter. The steam-pipe *b* has secured upon its end within the boiling-vessel A the four-way nozzle C, having the discharge-nozzles *c c c c*, with their discharge-exits lying preferably horizontal in relation to the pipe *b*. The discharge-nozzle may be what is termed "multiplex," and may be provided with any desirable number of exit-nozzles, the object being to diffuse the steam as it leaves the steam-pipe *b*, and thereby thoroughly permeate the brine in the tank A.

In this example of my invention I have illustrated a four-way multiplex nozzle; but I do not restrict myself in this particular specifically, as any number of exit-nozzles will serve the same purpose.

Near the upper part of the tank A, I provide the diaphragm E, having the central opening, *e*, for escape of the steam, and in the top of the said tank I provide the steam-escape pipe *d*.

The vessel A is provided with the usual man-holes, G, I, and F, to permit access to the interior of said vessel for the purpose of cleaning the same, and the brine-inlet pipe *a* is provided with the straight portion *a'*, for the purpose of more easily effecting the removal of scale that may become deposited in the angle of said pipe.

The filter is of the well-known Hyatt pattern, or any suitable filter will answer for the purposes of my invention.

The natural saline brine is introduced into the steam-tight vessel A, through the pipe *a*, simultaneously with a column of steam which is introduced through the pipe *b*, and diffused through the cross-shaped discharge-nozzles into the brine in the vessel A. The brine thus introduced into said vessel is thoroughly permeated by the column of steam, and the temperature thereof is rapidly raised to a boiling-point—*i. e.*, 212° Fahrenheit—and as soon as ebullition commences the chlorides (usually calcium and magnesia) are suspended in solution in the brine, and in this condition the brine is introduced through the discharge-pipe D into the filter B, where it is purified under steam-pressure, and from the filter is drawn off through the pipe J, Fig. 4, into the saturating-vessel, from which, after it has been saturated to 100° salinometer, it is introduced into the grainer, and the operation completed. A series of tri-cocks are connected to the vessel A, to indicate the height of brine in the said vessel and the temperature thereof, and the valves H H' serve to connect or shut off the flow to the filter B. The steam column, entering the vessel A through the pipe *b* in the bottom thereof, permeates the brine at the lowest point—that is, at the bottom of said vessel; hence the boiling process is commenced immediately when the brine and steam enter the vessel A, and the process is thereby greatly facilitated, and is rendered more efficient than in any of the apparatus heretofore employed for this purpose.

The diaphragm E slopes toward the center, as shown in Fig. 3, and is provided with a central aperture or opening, *e*, which permits the escape of the steam, and in a measure prevents the overflow of the brine through the steam-exit pipe *d*, which would occur if no provision was made to prevent the same in the vessel A.

As already explained, the man-holes G, I, and F afford access to the interior of the vessel A, for the purpose of cleansing the same.

It will be observed that the introduction of the natural unpurified brine into the vessel A through the bottom thereof, together with the column of steam introduced simultaneously therewith, forms an important step in the manufacture of salt in the described process, and the boiling-vessel, constructed as described and shown, affords a very efficient apparatus with which to carry out the step or process of purifying the saline brine, and the aforesaid apparatus used in connection with the filter B, as described, prepares the brine for treatment in the saturator and the final step—that is, the graining operation—with great efficiency and rapidity, producing thereby a product of better quality, and greatly reducing the time required in the process of manufacturing salt; and, furthermore, experience has shown that where the brine contains impurities, even to a small extent, such impurities are precipitated onto the steam-pipes in the grainer, coating the same and preventing the radiation of the heat into the brine, thereby retarding the graining operation and necessitating frequently a removal of the steam-pipe for the purpose of cleaning off the scale or the frequent replacing, and for this reason it is of vital importance to introduce the brine in as pure a state as possible into the grainer, in order to obviate the difficulties explained; and experience also shows that where the brine is brought to the boiling-point and the chlorides are suspended therein when the brine is introduced into the filter that the filter operates with greater efficiency in purifying the brine, and better results therefore accrue, and my improved process and apparatus for carrying out the same secure the desirable result, as heretofore described.

The operation of my invention will be readily understood from the foregoing and from a consideration of the drawings.

The unpurified brine is introduced into the boiling-vessel A simultaneously with the steam, and the boiling process commences immediately, and access is had to the brine to test the height and temperature through the medium of the tri-cocks, and as soon as ebullition takes place the brine is ready for introduction into the filter. When purified, it is introduced into the saturator and grainer, as already explained.

The operation is substantially continuous, and is only interrupted for the purpose of cleansing the boiling-vessel or filter, and, if desired, the apparatus can be duplicated and provided with suitable connections, whereby one set can be shut off from the other and cleansed while the other continues the process.

Having thus fully described my invention, what I claim as new, and desire to secure by Letters Patent, is—

1. In the manufacture of salt, the herein-described step in the process, consisting of introducing the natural unpurified brine into a vessel through the bottom thereof in the presence of and in direct contact with steam under pressure, and maintaining a high pressure within the vessel during the boiling operation, and in withdrawing the brine while boiling from the vessel through the side thereof at a point above the brine and steam inlets, substantially as and for the purpose set forth.

2. The herein-described vessel for boiling saline brine, consisting of the steam-tight boiler A, having the brine-inlet pipe $a$ and steam-pipe $b$ in the bottom thereof, and the exit-pipe D in the side of said vessel, above the inlet-pipes, for removing the brine, and the steam-exit pipe $d$, substantially as and for the purpose set forth.

3. In an atomizing-vessel, the combination of the cylindrical boiler A, steam-pipe $b$ in the bottom thereof, the four-nozzle discharge C, having the nozzles $c\ c$ extending horizontally within the vessel, and the brine-inlet pipe $a$, substantially as and for the purpose set forth.

4. The combination of the brine-inlet pipe $a$, steam-pipe $b$, both located in the bottom of the atomizing-vessel, and the diaphragm E, having central opening, $c$, substantially as and for the purpose set forth.

In testimony whereof I have hereunto signed my name, in the presence of two attesting witnesses, at Syracuse, in the county of Onondaga, in the State of New York, this 26th day of January, 1887.

JOHN H. DUNCAN.

Witnesses:
CLARENCE DIELENBACK,
FREDERICK H. GIBBS.